United States Patent
Crosby

(10) Patent No.: US 9,189,364 B2
(45) Date of Patent: *Nov. 17, 2015

(54) SELECTIVE MONITORING OF SOFTWARE APPLICATIONS

(71) Applicant: Riverbed Technology, Inc., San Francisco, CA (US)

(72) Inventor: Peter Anthony Crosby, Merrimack, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 13/949,162

(22) Filed: Jul. 23, 2013

(65) Prior Publication Data

US 2014/0013310 A1  Jan. 9, 2014

Related U.S. Application Data

(63) Continuation of application No. 12/176,325, filed on Jul. 18, 2008, now Pat. No. 8,495,577.

(60) Provisional application No. 60/968,017, filed on Aug. 24, 2007.

(51) Int. Cl.
  *G06F 9/44*  (2006.01)
  *G06F 11/34*  (2006.01)

(52) U.S. Cl.
  CPC ...... *G06F 11/3466* (2013.01); *G06F 2201/865* (2013.01); *G06F 2201/88* (2013.01)

(58) Field of Classification Search
  CPC .......... G06F 11/3466; G06F 2201/865; G06F 2201/88
  USPC ......................................................... 717/125
  See application file for complete search history.

(56) References Cited

U.S. PATENT DOCUMENTS 5,949,415 A * 9/1999 Lin et al. ........................ 715/740
6,061,724 A * 5/2000 Ries et al. ..................... 709/224

(Continued)

OTHER PUBLICATIONS

Fursin et al., "A Practical Method for Quickly Evaluating Program Optimizations", 2005, Springer-Verlag Berlin Heidelberg, pp. 29-46.*

(Continued)

*Primary Examiner* — Anna Deng
*Assistant Examiner* — Junchun Wu
(74) *Attorney, Agent, or Firm* — Park, Vaughan, Fleming & Dowler LLP; Laxman Sahasrabuddhe

(57) ABSTRACT

An application monitoring system autonomously selects routines for performance monitoring based on characteristics of the content of the routines. These characteristics are preferably related to aspects of routines that are likely candidates for performance improvement, such as repetitive loops, event waits, synchronized blocks, and on. Routines that appear to be relatively un-improvable are excluded from initial monitoring, and routines that are subsequently determined to be relatively un-improvable, based on performance analysis and/or user feedback, are excluded from future monitoring. The determination of each routine's candidacy for monitoring is maintained over time, so that each subsequent monitoring session need not repeat the determinations. Changed routines are routinely re-monitored and/or re-assessed to affirm or modify the routine's candidacy for subsequent monitoring.

21 Claims, 1 Drawing Sheet

(56) References Cited

U.S. PATENT DOCUMENTS

| | | | |
|---|---|---|---|
| 7,143,396 B2* | 11/2006 | Suresh | 717/130 |
| 7,185,320 B2* | 2/2007 | Gouriou et al. | 717/130 |
| 7,269,824 B2* | 9/2007 | Noy et al. | 717/127 |
| 7,415,699 B2* | 8/2008 | Gouriou et al. | 717/127 |
| 8,214,814 B2* | 7/2012 | Barsness et al. | 717/151 |
| 8,898,277 B2* | 11/2014 | Chen | 709/224 |
| 2005/0034102 A1* | 2/2005 | Peck | 717/124 |
| 2005/0071821 A1* | 3/2005 | Levine et al. | 717/130 |
| 2005/0278703 A1* | 12/2005 | Lo et al. | 717/126 |
| 2006/0101416 A1* | 5/2006 | Callahan et al. | 717/128 |
| 2009/0132863 A1* | 5/2009 | Ashfield et al. | 714/45 |
| 2009/0144698 A1* | 6/2009 | Fanning et al. | 717/120 |
| 2010/0269101 A1* | 10/2010 | Jirman et al. | 717/125 |
| 2014/0137083 A1* | 5/2014 | Meagher et al. | 717/130 |

OTHER PUBLICATIONS

Woodside et al., "The Future of Software Performance Engineering", 2007, IEEE.*

Chi et al. "Improving Cache Performance by Selective Cache Bypass", 1989, IEEE.*

* cited by examiner

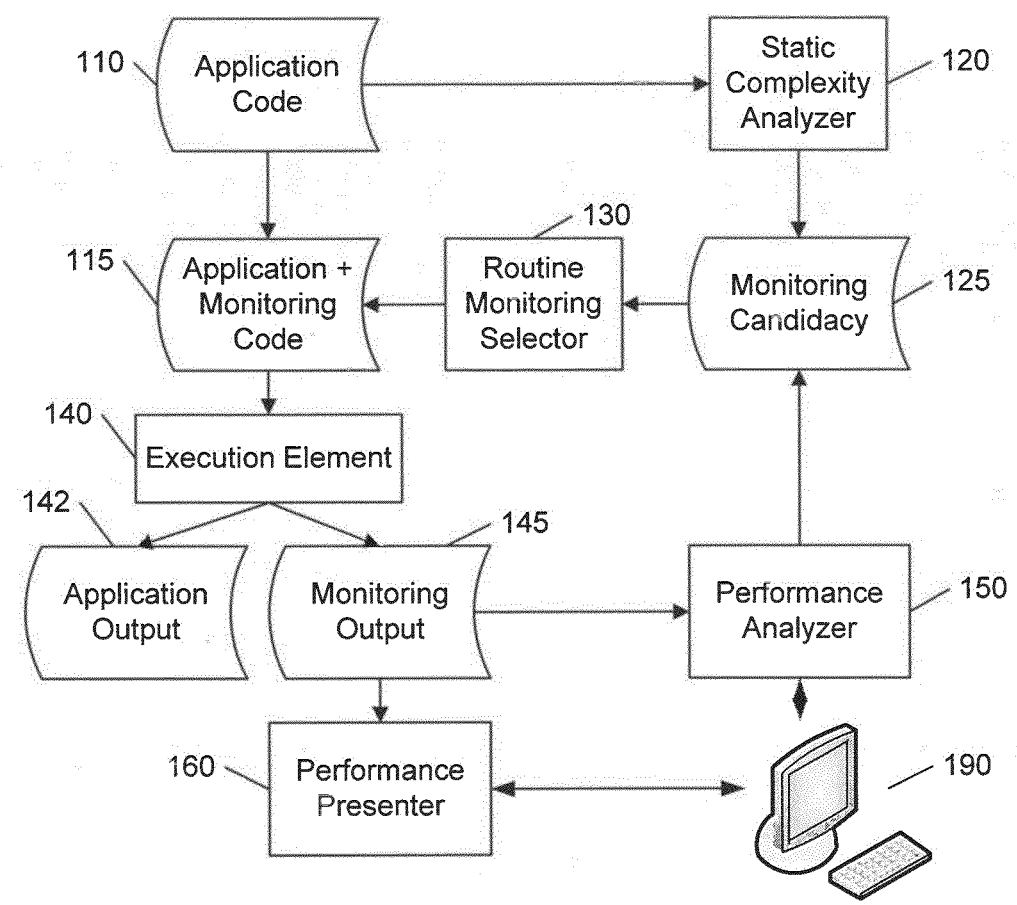

SELECTIVE MONITORING OF SOFTWARE APPLICATIONS

CROSS-REFERENCE TO RELATED APPLICATION(S)

This application is a continuation of U.S. application Ser. No. 12/176,325, filed 18 Jul. 2008, which claims the benefit of U.S. Provisional Patent Application 60/968,017, filed 24 Aug. 2007, both of which are incorporated herein by reference in their entireties.

BACKGROUND AND SUMMARY OF THE INVENTION

This invention relates to the field of software engineering, and in particular to a performance monitoring method and system for efficiently monitoring software applications.

Software performance monitoring systems, or profilers, are common in the art. As each function or subroutine is executed, a count is maintained to record how often each routine is executed; in most monitoring systems, the total time spent within each routine is also accumulated, as well as other statistics related to the execution of each routine. The gathered data is processed and presented to the user, generally in the form of histograms and bar charts so that the most often called routines, or the routines that consume the most time, are readily identifiable.

Conventional performance monitoring systems can generally be classified as manually-configured or automated. In a manually-configured performance monitoring system, the software developer specifically includes calls to predefined monitoring functions in selected routines, and the monitoring provides performance statistics for each of the configured routines. In an automated system, the monitoring system automatically includes monitoring functions in each routine.

Manually-configured monitoring systems require the user to determine which routines will be of interest for potentially improving performance, and are generally used when specific parts of an application are known or suspected to be substantial consumers of time and resources that may require further work for improving performance. Such systems are poorly suited for providing an overall assessment of an application's performance to identify possible candidates for improvement.

Automated monitoring systems do not require an a priori identification of candidate routines for improvement, and are generally purposely designed to provide an exhaustive assessment of an application's performance. While automated software performance monitoring systems are generally effective for assessing applications having perhaps a few hundred routines, their effectiveness for assessing large applications having thousands of routines is severely limited.

The reasons for the ineffectiveness of conventional automated monitoring systems for assessing large applications are varied. The time and resources required to monitor each and every routine in a large application can be substantial, and the overhead associated with monitoring and accumulating the performance data can render the application unsuitable for its intended purpose.

Additionally, in any application, there are many 'core' routines that are repeatedly executed, and will regularly appear in the histograms and bar charts as routines that significantly affect the performance of the application. However, the fact that these core routines are 'substantial consumers' of time or resources may have little bearing on determining how to improve the performance of the application, other than in a theoretical sense. If, for example, an application is data-intensive and the storing and retrieving of data consumes a large portion of time, this consumption may not be a problem, per se, if the time to store or retrieve each block of data is commensurate with the current state of the art. In like manner, arithmetic routines in an application that is computation-intensive can be expected to consume a substantial amount of the application's time, and a high consumption of time would not necessarily be indicative of a problem.

Similarly, beyond the core routines, there may be higher level routines that are known to be designed as well as the state of the art allows, and their regular appearance as substantial consumers on the performance monitoring displays, along with the aforementioned core routines, only serves to obscure the less obvious routines for which performance improvements may be achieved.

Conventional software monitoring systems are also not generally well suited for assessments of ongoing applications that are continually revised and updated. When a new version of an application is to be released, a performance assessment will generally be conducted. In most cases, the results of this analysis are presented to the user, and if the results are not substantially different from the assessment of the prior version, the new version is approved for release. However, such comparisons are often obscured by the presence of all of the aforementioned 'substantial consumer' routines, and unless the new release has a significant effect on one of these substantial routines, or introduces a new routine whose consumption approaches the level of these substantial routines, the presence of inefficient routines in the new release will often go unnoticed. Over time, the accumulation of such unnoticed inefficiencies with each release of the application can often result in a degree of inefficiency that necessitates a major rewrite of large portions of the application.

It would be advantageous to provide an automated performance monitoring system that provides for selective monitoring and reporting of routines that affect the performance of an application. It would also be advantageous if the selective monitoring is dynamically configurable. It would also be advantageous if some or all of the selective monitoring is autonomous to the monitoring system. It would also be advantageous if the selective monitoring is based on the selection of routines that are likely to be improvable.

These advantages, and others, can be realized by an application monitoring system that autonomously selects routines for monitoring based on characteristics of the content of the routines. These characteristics are preferably related to aspects of routines that are likely candidates for performance improvement, such as repetitive loops, event waits, synchronized blocks, and on. Routines that appear to be relatively un-improvable are excluded from initial monitoring, and routines that are subsequently certified as being relatively un-improvable are excluded from future monitoring. The determination of each routine's candidacy for monitoring is maintained over time, so that each subsequent monitoring session need not repeat the determinations. Changed routines are routinely re-monitored and/or re-assessed to affirm or modify the routine's candidacy for subsequent monitoring.

BRIEF DESCRIPTION OF THE DRAWING

The invention is explained in further detail, and by way of example, with reference to the accompanying drawing wherein:

FIG. 1 illustrates an example performance monitoring system in accordance with this invention.

This drawing is included for illustrative purposes and is not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

FIG. 1 illustrates an example performance monitoring system in accordance with this invention. A monitoring selector 130 is configured to identify which routines in an application 110 are to be monitored. As can be seen, a preferred embodiment of this invention includes a closed loop system for iteratively improving the selection of routines to be modified, based on prior outputs 145 of the monitoring process.

Initially, the application code 110 is analyzed by a static complexity analyzer 120 to identify candidate routines for monitoring based on the characteristics of the content of each routine. Preferably, this analysis is performed on the binary code of the application, after the code has been optimized by a compiler, but it can be performed at any level. Optionally, the static complexity analyzer 120 may be included in a compiler of higher-level code.

In an example embodiment, the analyzer 120 uses the standard JVMTI (Java Virtual Machine Tool Interface) defined by Sun Microsystems and provided by Java Virtual Machine vendors to intercept Java classes as they are loaded by the Java Virtual Machine. The JVMTI ClassFileLoadHook event provides, for each loaded class, the opportunity to analyze the byte code of each method within the class and determine whether the code contains characteristics that are correlated to a potential for performance improvement, such as:

code that includes a loop,
code that includes calls to other routines,
code that includes a wait for an event, and
code that includes a synchronized block.

One of skill in the art will recognize that, based on heuristics or other experiential data, other characteristics may be identified as being correlated to a potential for performance improvement, and can be included in this example list as well.

If a block of code does not contain any of these characteristics, it is classified as a non-candidate for monitoring, because the likelihood that the routine can be modified to improve its performance is low, based on this heuristic assessment of characteristics that suggest a potential for improvement. Optionally, in lieu of a yes/no classification of a routine's candidacy for monitoring, the monitoring candidacy 125 of each routine may be a quantitative score that is determined for each routine based on the characteristics of its content.

The routine monitoring selector 130 is configured to select routines for monitoring, based on their monitoring candidacy 125, and to augment the application code 110 with monitoring code for each of the selected routines. Using the aforementioned JVMTI example embodiment, the byte code for the class is modified to insert measurement code before and after the body of each selected routine.

The augmented code 115 is provided to an execution element 140, such as the aforementioned Java Virtual Machine, which, in addition to the output 142 of the application, also generates the requested performance monitoring data 145. By filtering routines that are not likely to be targets for performance improvement, based on the characteristics of the content of the routines, the overhead associated with executing 140 the augmented code 115 is substantially reduced. Of particular note, most 'core' routines will be classified as non-candidates, because they generally lack the above example characteristics that suggest a potential for improvement, thereby substantially minimizing the overhead associated with monitoring routines, and substantially minimizing the typical 'display clutter' caused by such routines in conventional automated monitoring systems.

In accordance with another aspect of this invention, a performance analyzer 150 is provided to dynamically adjust the monitoring candidacy 125 of each routine based on the observed performance of the routines. In a preferred embodiment, the performance analyzer 150 creates a background thread within the application to periodically assess the monitoring output 145 regarding the frequency and duration of calls to the routines that are currently being monitored. If the performance analyzer 150 determines that a routine is being called frequently, and these calls always complete very quickly, as would be typical of any remaining 'core' routines, the performance analyzer 150 adjusts the monitoring candidacy 125 of that routine to identify it as a routine that is not to be monitored in the future. The above preferred criterion of frequent calls is used to avoid mistakenly ceasing the monitoring of what appears to be a quickly executing routine merely because in its first few executions, its execution time was short. In like manner, the preferred criterion of 'always' completing quickly is used, because core routines rarely exhibit irregular behavior.

The above preferred criteria has been found to be particularly effective for identifying routines for which the potential for improvement is low; however, one of skill in the art will recognize that other performance-based criteria may also or alternatively be used to identify routines that do not appear to be potential candidates for improvement.

In a straightforward embodiment of this aspect of the invention, each time the application is loaded, the static complexity analyzer 120 only modifies the monitoring candidacy of new or changed routines, and the monitoring selector 130 creates a new version of the augmented code 115 for execution by the execution element 140, based on the current monitoring candidacy 125. In this manner, routines that were previously classified as non-monitor candidates based on their prior performance characteristics will not be monitored in subsequent executions of the application, further reducing the overhead associated with the monitoring of the application.

In a more optimized embodiment of this aspect of the invention, the recreation of the augmented code 115 is avoided by configuring the monitoring code in each routine to be selectively bypassed. In a preferred embodiment, an integer identifier is assigned to each of the routines for which monitoring code has been included in the augmented code 115. The monitoring code in each routine uses this identifier to access an array that indicates whether the monitoring code should be enabled. When the monitoring candidacy 125 of any routine is changed, the monitoring selector 130 changes the corresponding entry in the array accordingly. If, during execution of the augmented code 115, the entry indicates that the monitoring code is not to be enabled, the collection of performance data for this routine is bypassed. In this manner, the overhead associated with monitoring routines that were initially identified as candidate routines, but subsequently determined to be non-candidates, can be eliminated without recreating the augmented code 115.

One of skill in the art will recognize that if the monitoring candidacy measures are binary monitor/don't-monitor values, the candidacy measures 125 will be equivalent to the aforementioned enabling array, and no further processing by the selector 130 will be required; in like manner, if the candidacy measures 125 are quantitative values, a simple thresholding operation on the candidacy measures 125 will also be equivalent to the aforementioned enabling array.

Depending upon the structure of the execution element 140 and the augmented code 115, the use of an enabling identifier will either affect the current execution of the code 115, or will effect subsequent executions of the augmented code 115. If the enabling array that is accessed by each potentially monitored routine is modifiable during execution of the application, the monitoring of routines can be terminated based on the observed performance during an initial monitoring period, thereby furthering the reduction in overhead associated with automated performance monitoring.

As illustrated in FIG. 1, the performance analyzer 150 is coupled to a user interface 190. In a preferred embodiment, the user is provided the option of overriding the system's determination that the monitoring of a given routine should be terminated. In like manner, the user interface 190 may be configured to control or modify the determinations made by the static complexity analyzer 120 as well. For example, the user may be given the option to bypass the analyzer 120 by selecting a "monitor all" option, and allow the system to subsequently adjust the monitoring based on the observed performance of all of the routines.

In accordance with a further aspect of this invention, the user is provided the option of disabling the monitoring of any routine. In this manner, if the performance presentation 160 includes routines that the user has determined to be infeasible or impractical to improve, the user can identify these routines via the user interface 190. In this manner, the user can remove these routines from obscuring the presentation of potentially improvable routines.

By providing a dynamic and/or iterative refinement of routines to be monitored, based on performance analysis and user feedback, the efficient collection and meaningful presentation of performance information can be significantly enhanced. Additionally, by retaining the refined monitoring candidacy of the routines of an application, the performance effects of changes to the application can be more readily assessed. In a preferred embodiment of this invention, the static complexity analyzer 120 is configured to assess all new routines, and re-assess all changed routines.

Optionally, when a new version of the application is submitted to the system, the analyzer 120 may be configured to automatically characterize all new and changed routines as routines to be monitored so that the effect of the changes can be recorded and reported, with subsequent refinement of the monitoring based on performance analysis of the new version of the application. In this manner, new or changed routines that exhibit static characteristics and/or performance characteristics that suggest potential for improvement can be more readily identified, and not obscured by previously assessed routines that are substantial consumers of time and resources.

As noted above, the use of JVMTI facilitates an embodiment of this invention. However, one of skill in the art will recognize that the concepts of this invention are not limited to this example embodiment. For example, in a Microsoft .NET environment, the same general techniques as described above for Java code can be used, with the exception that the interface used to get information about the routines and to create the augmented code is not JVMTI, but instead makes use of Microsoft ICorProfiler callbacks to get information about routines being loaded. The routine's code is then modified by calling the appropriate ICorProfilerInfo 'set' method to insert the monitoring code into the application.

The foregoing merely illustrates the principles of the invention. It will thus be appreciated that those skilled in the art will be able to devise various arrangements which, although not explicitly described or shown herein, embody the principles of the invention and are thus within its spirit and scope. For example, to further reduce the overhead associated with the monitoring of routines, a background thread may periodically calculate the total amount of time spent in each monitored routine as a percentage of the time spent in all routines being monitored, using for example, a rolling average. Based on this measure, the monitored data is only reported to the performance presenter 160 and/or the performance analyzer 150 if it exceeds a given threshold amount. In this manner, only the most important information about the performance of the application is reported and/or analyzed, further reducing the overhead associated with monitoring routines in this invention. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality" of an element includes two or more of the claimed element, and does not imply any particular range of number of elements; that is, a plurality of elements can be as few as two elements, and can include an immeasurable number of elements.

What is claimed is:

1. A system comprising:

an analysis module configured to analyze routines within an application code and to assign respective monitoring candidacy measures to each of the routines based on respective content of the routines;

a selection module configured to select a routine from among the routines for monitoring based on the respective monitoring candidacy measures, and augment the application code with monitoring code configured to facilitate collection of performance data for the selected routine;

a memory configured to store the augmented application code and the respective monitoring candidacy measures between executions of the application code; and a processor configured to execute the modules;
wherein the monitoring code comprises a monitoring identifier corresponding to the selected routine, the selection module is further configured to selectively change the monitoring identifier to enable or disable monitoring of the selected routine, and the system is configured to bypass the collection of the performance data for the selected routine when the monitoring of the selected routine is disabled.

2. The system of claim 1, further comprising:
a performance analysis module configured to modify the monitoring candidacy measure assigned to the selected routine based on the performance data.

3. The system of claim 1, wherein the selection module is further configured to selectively change the monitoring identifier based on changes to the monitoring candidacy measure assigned to the selected routine.

4. The system of claim 1, further comprising:
a compiler configured to enhance the application code, wherein the analysis module is further configured to analyze the routines within the enhanced application code.

5. The system of claim 1, wherein the analysis module is further configured to analyze the content of each of the routines for the presence of at least one of:
a loop;
a call to other routines;
a wait for an event; and
a synchronized block.

6. The system of claim 1, wherein the analysis module is further configured to analyze only routines that have been added or changed since a prior execution of the application code from among the routines.

7. A monitoring system, comprising:
an analysis module configured to analyze routines within an application code to assign each routine a respective monitoring candidacy measure based on content of the routine, wherein the monitoring candidacy measure represents a potential for performance improvement of the respective routine;
a monitoring selection module configured to:
    select a routine from among the routines to be monitored based on the monitoring candidacy measure assigned to the selected routine, and
    augment the application code with monitoring code that facilitates collection of performance data for the selected routine;
a non-transitory memory that is configured to store the augmented application code; and
a processor configured to execute the modules, wherein the respective monitoring candidacy measure assigned to each routine is retained between executions of the application code, the monitoring code is configured to allow selective bypassing of the collection of performance data for the selected routine, based on an enabling parameter associated with the selected routine, and the monitoring selection module is further configured to selectively control the enabling parameter of the selected routine based on changes to the monitoring candidacy measure assigned to the selected routine.

8. The monitoring system of claim 7, wherein the analysis module is further configured to analyze the content of each of the routines for the presence of at least one of:
a loop,
calls to other routines,
a wait for an event, and
a synchronized block.

9. The monitoring system of claim 7, wherein the analysis module is configured to only analyze routines that have been added or changed since a prior execution of the application code from among the routines.

10. The monitoring system of claim 7, further comprising:
a performance analysis module configured to modify the monitoring candidacy measure assigned to the selected routine based on the performance data for the selected routine.

11. The monitoring system of claim 10, wherein the performance analysis module is further configured to modify the enabling parameter of the selected routine when the selected routine exhibits an average execution time that is below a given threshold.

12. The monitoring system of claim 10, wherein the performance analysis module is further configured to modify the enabling parameter of the selected routine when the selected routine is executed at least a given number of times and exhibits an average execution time that is below a given threshold.

13. The monitoring system of claim 7, wherein the monitoring code is configured to change the enabling parameter associated with the selected routine during execution of the augmented code and thereby cause bypass of the collection of the performance data for the selected routine.

14. The monitoring system of claim 7, wherein the processor is further configured to execute the augmented code and thereby produce the performance data.

15. The monitoring system of claim 7, further comprising:
a user interface configured to facilitate modification of the monitoring candidacy measure assigned to one of the routines by a user of the monitoring system.

16. A method comprising:
analyzing routines within an application code and assigning respective monitoring candidacy measures to each of the routines based on respective content of the routines, wherein the content comprises a sequence of instructions;
selecting a routine from among the routines for monitoring based on the respective monitoring candidacy measures;
augmenting the application code with monitoring code configured to facilitate collection of performance data for the selected routine;
storing the augmented application code and the respective monitoring candidacy measures in a memory between executions of the application code;
selectively changing a monitoring identifier associated with the selected routine based on changes to the monitoring candidacy measure assigned to the selected routine, the monitoring identifier enabling or disabling monitoring of the selected routine; and
bypassing the collection of performance data for the selected routine when the monitoring identifier has been changed to disable monitoring.

17. The method of claim 16, further comprising:
accessing the monitoring identifier during execution of the augmented code,
wherein the bypassing occurs during execution of the augmented code.

18. The method of claim 16, further comprising:
modifying the monitoring identifier based on the performance data for the selected routine.

19. The method of claim 16, further comprising:
modifying the monitoring candidacy measure assigned to the selected routine based on the performance data for the selected routine.

20. The method of claim 19, wherein the modifying is based on an average execution time of the selected routine.

21. The method of claim 16, further comprising:
    modifying the monitoring candidacy measure assigned to the selected routine based on input from a user interface.

* * * * *